Nov. 30, 1926.  1,609,245
C. HAENGGI, JR
DIE FOR CUTTING SCREWS
Filed March 6, 1925

Inventor
Charles Haenggi fils
By [signature]
atty

Patented Nov. 30, 1926.

1,609,245

UNITED STATES PATENT OFFICE.

CHARLES HAENGGI, JR., OF BASEL, SWITZERLAND.

DIE FOR CUTTING SCREWS.

Application filed March 6, 1925, Serial No. 13,529, and in Switzerland March 14, 1924.

The present invention relates to improvements in dies for cutting screws and to be used in stocks. The known dies consisting of one solid piece slit in a radial direction to permit of an adjustment for wear are apt to frequent rupture at the portion opposite to the slit.

In order to overcome this disadvantage the die according to the present invention is composed of individual parts linked together. Preferably the hinge joint between the parts of the die is made by means of straps and pivot pins.

These dies present the advantage that they can be opened in order to conveniently grind the working faces of the cutting teeth by means of an emery wheel, which is not possible with solid dies. Further the dies according to the present invention permit a comparatively wide range of adjustment so that screw thread having abnormal diameters can be cut.

Figure 1:
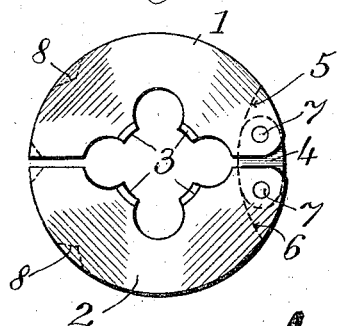
Figure 2:
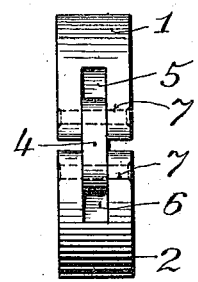
Figure 3:
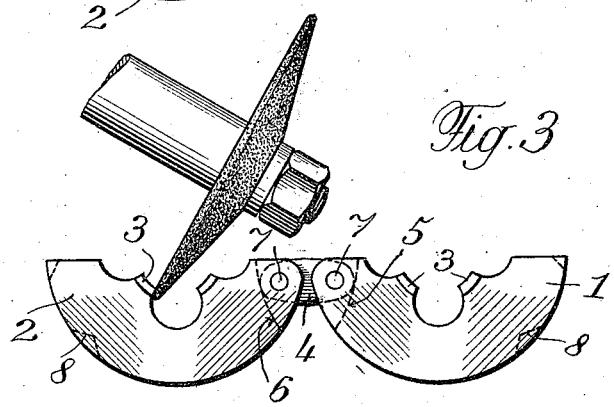
Figure 4:
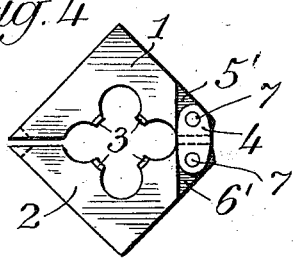
Figure 5:
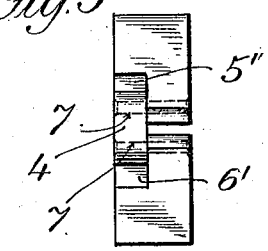
Figure 6:
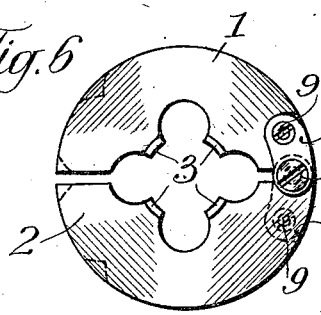
Figure 7:
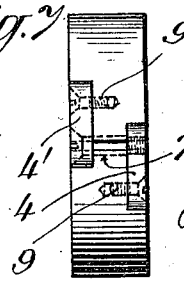

Constructional examples of the subject matter according to the present invention are illustrated on the accompanying drawings, in which:

Figs. 1 and 2 show one constructional example in a plan-view and in a side view respectively, Fig. 3 shows the dies according to Figs. 1 and 2 opened when grinding the cutting faces, Figs. 4 and 5 show in a plan-view and in a side view respectively a second constructional example and Figs. 6 and 7 show in a plan-view and side view respectively a third constructional example.

Referring now to the constructional example illustrated in Figs. 1 and 2, the cylindrical die consists of two parts 1 and 2 provided with the cutting faces 3. The parts 1 and 2 are linked together by means of a strap 4, inserted in grooves 5 and 6 in the parts 1 and 2 respectively, and the pivot pins 7. The die is of the same shape and dimension as the hitherto known dies and can be used in the usual stocks. The indentations 8 serve to receive the means for adjusting the die, for instance the binding screws provided in the stock.

In Fig. 3 the die according to Figs. 1 and 2 is opened and an emery wheel is shown to cooperate with one of the cutting faces 3 to sharpen the latter.

In the constructional example illustrated in Figs. 4 and 5 the die is of a square shape and consists again of the parts 1 and 2. Instead of the central grooves 5 and 6 in the parts 1 and 2 respectively of the first constructional example one sided grooves 5' and 6' are provided in which the strap 4 is lodged.

The constructional example illustrated in Figs. 6 and 7 differs from that shown in Figs. 1 and 2 inasmuch as only one pivot pin consisting of a set screw 7'' is provided which is connected to the parts 1 and 2 by means of the straps 4' and 4'' respectively, the latter being fixed to the respective parts by means of the set screws 9 and 9'.

I claim:

1. A two-part screw-threading die whose contour is substantially a regular geometric figure and having cutting faces for cutting only a single thread and arranged for insertion in die holding means having a correspondingly shaped opening, comprising a link arranged within the contour of the die when in its operative position having a pivotal connection with each die part to hold them together and to permit full opening of the die parts.

2. A two-part screw-threading die whose contour is substantially a regular geometrical figure and having cutting faces for cutting only a single thread arranged about a centre and for insertion in a die holder; comprising a link having a pivotal connection with the die parts, said die parts having recesses in which the link is arranged within the contour and thickness of the die when the latter is in operating position in its holder.

3. A two-part screw-threading die whose contour is substantially a regular geometrical figure and having a set of cutting faces for cutting only a single thread and said parts symmetrical with respect to a centre and for insertion in a die-holder; comprising two links pivotally connected together and to a die part and arranged within the contour of the die when in operative position.

4. A two-part screw-threading die whose contour is substantially a regular geometrical figure and having cutting faces for cutting only a single thread; comprising at least one link arranged in a recess in each die part adjacent one end of the opposed faces of the die parts and pivotally connecting them, and a recess adjacent the opposite end faces for the reception of adjusting screws of a die holder into which said two-part die is to be placed, said link lying within the die parts when in their operative position.

5. A two-part screw-threading die of substantially regular geometrical shape and having cutting faces for cutting a single thread; comprising a link or links pivotally connecting the die parts together and lying wholly within the die parts when in their operative position, and said parts having external seats for the reception of adjusting screws of a die holder, one of said seats being formed partly in one die part and partly in the other die part.

6. A two-part cylindrical screw-threading die having cutting faces for cutting a single thread; comprising a link pivoted to one of the die parts in a recess in its side, a link pivoted in the other die part in its opposite side and a pivot passing between both of the die parts on which both links pivot, said links lying within the contour of the parts when in their operating position.

In testimony whereof, I have signed my name to this specification.

CHARLES HAENGGI, Fils.